(12) United States Patent
Miyata et al.

(10) Patent No.: US 7,997,897 B2
(45) Date of Patent: Aug. 16, 2011

(54) METHOD OF DISCHARGING GAS FROM CONTINUOUS OVEN AND GAS DISCHARGE STRUCTURE

(75) Inventors: Jotaro Miyata, Komaki (JP); Takashi Goshima, Kohnan (JP); Chikashi Ihara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 485 days.

(21) Appl. No.: 12/175,251

(22) Filed: Jul. 17, 2008

(65) Prior Publication Data

US 2008/0280244 A1    Nov. 13, 2008

Related U.S. Application Data

(63) Continuation of application No. PCT/JP2007/051507, filed on Jan. 30, 2007.

(30) Foreign Application Priority Data

Feb. 10, 2006  (JP) .................................. 2006-033755

(51) Int. Cl.
*F23G 7/06* (2006.01)

(52) U.S. Cl. ............................ 432/72; 432/121; 266/144
(58) Field of Classification Search .................... 432/72, 432/65, 121, 143, 150, 152, 193, 200; 266/144, 266/157

See application file for complete search history.

(56) References Cited

U.S. PATENT DOCUMENTS

| | | | | |
|---|---|---|---|---|
| 3,554,508 A | * | 1/1971 | Dell'Agnese | 432/46 |
| 4,715,810 A | * | 12/1987 | Ramsey et al. | 432/8 |
| 4,878,839 A | * | 11/1989 | Wunning | 432/72 |
| 2008/0110394 A1 | * | 5/2008 | Noda et al. | 117/88 |
| 2008/0197544 A1 | * | 8/2008 | Saijo et al. | 264/671 |

FOREIGN PATENT DOCUMENTS

| | | |
|---|---|---|
| JP | A-63-217188 | 9/1988 |
| JP | A-11-257862 | 9/1999 |
| JP | A-2002-249385 | 9/2002 |
| JP | A-2003-207274 | 7/2003 |

* cited by examiner

*Primary Examiner* — Gregory A Wilson
(74) *Attorney, Agent, or Firm* — Oliff & Berridge, PLC

(57) ABSTRACT

A to-be-burned object including a metal Si component or SiC or $Si_3N_4$ can be burned in such a manner that vaporized SiO can be safely exhausted without causing SiO attached to a wall of a furnace or an inner face of an exhaust duct. An exhaust method of a continuous furnace for continuously burning a to-be-burned object containing a metal Si component or highly-fire-resistant SiC or $Si_3N_4$ includes steps of 1) exhausting in-furnace gas including SiO vaporized during a burning process. An exhaust duct 2 used for this exhaust is provided at an upper part of a side wall 12 of the furnace having a higher temperature (1300 degrees C. or more) than a concentration temperature of SiO vaporized during a burning process. 2) oxidizing the exhausted SiO at the outside of the furnace to detoxify SiO. The in-furnace gas exhausted by the exhaust duct 2 is guided to an exhaust pipe 3 connected to an outlet of the exhaust duct 2 at the outside of the furnace. This exhaust pipe 3 includes oxygen supply holes 31*a* and 31*b*. By sending oxygen supplied from an appropriate oxygen supply source into the exhaust pipe 3, SiO guided to the exhaust pipe 3 reacts with oxygen and is detoxified.

4 Claims, 4 Drawing Sheets

METHOD OF DISCHARGING GAS FROM CONTINUOUS OVEN AND GAS DISCHARGE STRUCTURE

TECHNICAL FIELD

The present invention relates to an exhaust method and an exhaust structure of a continuous furnace for burning ceramics and refractory products for example.

BACKGROUND ART

The present applicant suggests an atmosphere continuous furnace for burning refractory products, an example of which is shown in Patent Document 1. As illustrated in Patent Document 1, this type of continuous furnace (see FIG. 5) includes a to-be-burned object path 14 surrounded by an in-furnace ceiling 11, an in-furnace side wall 12, and an in-furnace floor 13. The to-be-burned object path 14 includes, in an order from the inlet to the outlet, a medium-to-low-temperature zone, a high-temperature zone, and a cooling zone through which the to-be-burned object is burned while being moved in this order. The path is designed so that atmosphere gas flows from the outlet to the inlet. The furnace is generally designed so that the in-furnace gas is exhausted through an exhaust duct (not shown) provided in the medium-to-low-temperature zone at a position close to the inlet.

Patent Document 1: JP 2003-207274 A (claims and FIG. 1)

When the continuous furnace having the structure as described above accommodates a to-be-burned object that contains an alkaline component such as Na or K, the alkaline component vaporizes in the high-temperature zone. This has caused a disadvantage where the in-furnace gas containing this alkaline component deteriorates the refractory products (11, 12, 13) constituting the furnace, causing a reduced service life of the furnace.

In the case of a to-be-burned object containing a metal Si component and a highly-fire-resistant to-be-burned object mainly containing SiC or $Si_3N_4$, SiO caused by the oxidization thereof in a low-oxygen atmosphere gas environment vaporizes to partially turn into $SiO_2$ that is attached to an in-furnace ceiling surface and a side wall face. These components change, when combined with the alkaline component, to a strong glass-like solid substance that is accumulated on the in-furnace ceiling surface and the side wall face. This has caused a disadvantage where the operation of the to-be-burned object is hindered or the exhaust performance is significantly deteriorated. A risk has been also caused by SiO's strong oxidation reactivity to cause a case where SiO attached to the interior of the exhaust duct may oxidize to generate heat for example.

The present invention has been made in order to solve the above-described disadvantages. In particular, the present invention provides the exhaust method and the exhaust structure of the continuous furnace by which a to-be-burned object containing a metal Si component, a highly-fire-resistant SiC-containing ceramics, and $Si_3N_4$-containing ceramics are prevented from causing vaporized SiO attached to the in-furnace ceiling or the wall for example so that safe and easy exhaust can be achieved.

DISCLOSURE OF THE INVENTION

The above disadvantage can be solved by the first invention. The first invention is an exhaust method of a continuous furnace for continuously burning a to-be-burned object containing a metal Si component or highly-fire-resistant SiC or $Si_3N_4$, characterized by exhausting, at a region having a higher temperature than a concentration temperature of SiO generated and vaporized by the oxidization of them, in-furnace gas including the SiO by a positive pressure of an in-furnace atmosphere and oxidizing SiO at outside of the furnace to detoxify SiO.

The above disadvantage also can be solved by the second invention. The second invention is an exhaust structure of a continuous furnace for continuously burning a to-be-burned object containing a metal Si component or highly-fire-resistant SiC or $Si_3N_4$ under a positive in-furnace pressure, characterized by providing with an exhaust duct at an upper part of a side wall of the furnace at a region having a higher temperature than a concentration temperature of SiO generated and vaporized by the oxidation of them, the exhaust duct being provided in a downward direction with an angle of 5 to 20 degrees, and connecting with an outlet at the outside of the furnace of the exhaust duct to an exhaust pipe being provided in an up-and-down direction and consisting of a straight pipe, the exhaust pipe is provided with an oxygen supply means for oxidizing SiO to oxidize the SiO taken out from the exhaust duct.

When an Si component does not vaporize but an alkaline component vaporizes from a to-be-burned object, this can be solved by the third invention. The third invention is an exhaust method of a continuous furnace for continuously burning a to-be-burned object containing an alkaline component that vaporizes during a burning process and that concentrates when having a decreasing temperature, characterized by exhausting the alkaline component to the outside of the furnace by a positive pressure of an in-furnace atmosphere at a region having a higher temperature than a concentration temperature of the alkaline component vaporized during a burning process.

This also can be solved by the fourth invention. The fourth invention is an exhaust structure of a continuous furnace for continuously burning a to-be-burned object containing an alkaline component that vaporizes during a burning process and that concentrates when having a decreasing temperature under a positive in-furnace pressure, characterized by providing with an exhaust duct at an upper part of a side wall of the furnace of a region having a higher temperature than a concentration temperature of the alkaline component vaporized during a burning process, the exhaust duct being provided in a downward direction with an angle of 5 to 20 degrees, and connecting with an outlet at the outside of the furnace of the exhaust duct to an exhaust pipe being provided in an up-and-down direction and consisting of a straight pipe.

According to the exhaust method and the exhaust structure of the continuous furnace of the present invention, a vaporized/concentrated component included in in-furnace gas can be taken out to the outside of the furnace without using an exhaust apparatus such as a fan. Furthermore, oxidizing SiO can be taken out to the outside of the furnace without causing the concentration thereof to oxidize SiO at the outside of the furnace to detoxify SiO. Thus, advantages are obtained in that a refractory product constituting the furnace body can be prevented from being deteriorated and accumulation on the furnace wall can be prevented.

DESCRIPTION OF REFERENCE NUMERALS

Figure 1:
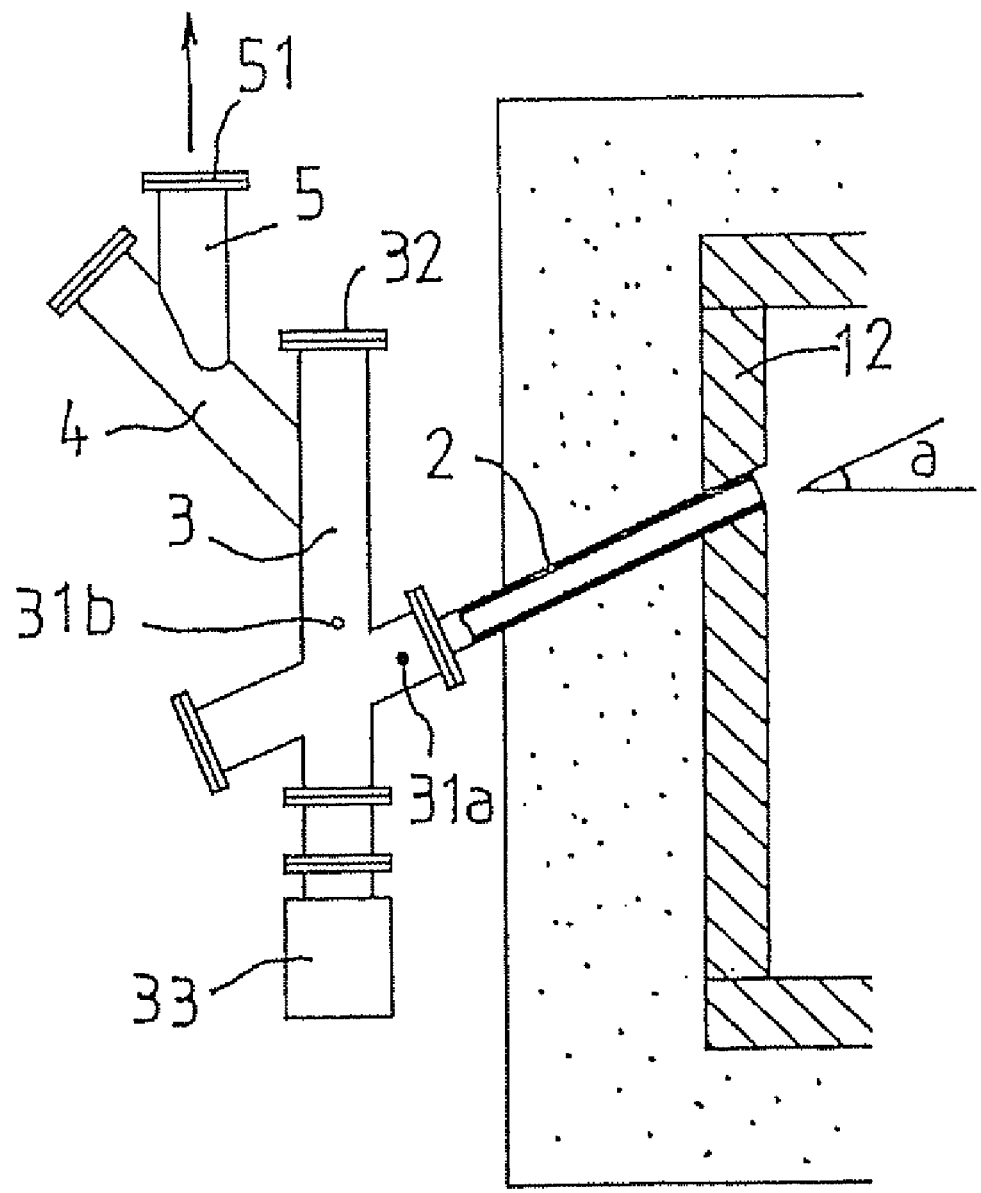
FIG. 1 is a main part side view/partial cutaway cross-sectional view of an apparatus of the exhaust structure of the continuous furnace of the present invention.

11 In-furnace ceiling
12 Side wall of furnace
13 In-furnace floor
14 To-be-burned object path
2 Exhaust duct
3 Exhaust pipe
31a and 31b Oxygen supply hole
32 and 33 Cleaning cover member
4 Second exhaust pipe
5 Third exhaust pipe
51 Exhaust opening
a Attachment angle

BEST MODE FOR CARRYING OUT THE INVENTION

Next, an embodiment according to the exhaust method and the exhaust structure of the continuous furnace of the present invention will be described. For convenience of the description, the exhaust structure of the continuous furnace of the present invention (the second invention) will be firstly described with reference to FIGS. 1 and 5 and FIGS. 3 and 4. Next, this exhaust structure will be used to describe the exhaust method of the continuous furnace of the present invention (the first invention).

Second Invention

The present invention is directed to the exhaust structure of the continuous furnace in which a to-be-burned object containing a metal Si component and a to-be-burned object mainly containing SiC or $Si_3N_4$ (including the case where the object contains an alkaline component) are continuously burned under a positive in-furnace pressure. The continuous furnace has the same furnace body structure as the one shown in FIG. 5 and includes the to-be-burned object path 14 surrounded by the in-furnace ceiling 11, the in-furnace side wall 12, and the in-furnace floor 13. The to-be-burned object path 14 includes, in an order from the inlet to the outlet, the medium-to-low-temperature zone, the high-temperature zone, and the cooling zone through which the to-be-burned object is burned while being moved in this order.

Figure 3B:
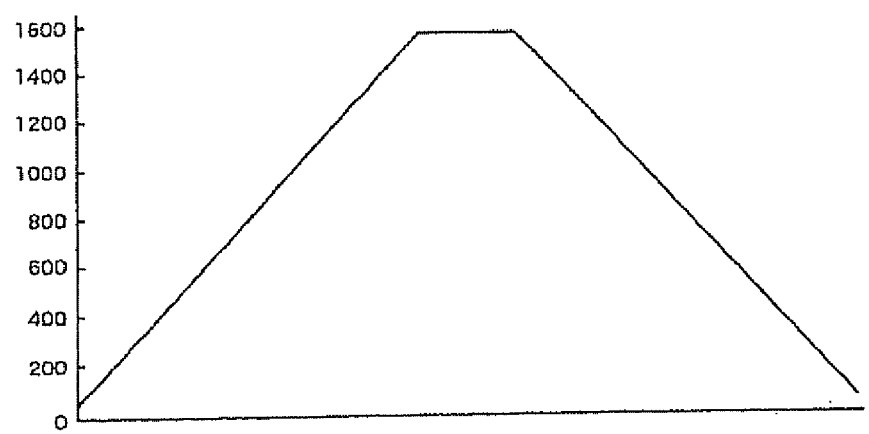
FIGS. 3A and 3B are a schematic view (A) of the furnace and a graph (B) showing the concept of a burning temperature (vertical axis) curve in the entire length of the continuous furnace (horizontal axis).
Figure 3A:

FIG. 3 shows an example of the burning temperature curve of the continuous furnace. In an order from the inlet (the leftmost part) to the outlet (the rightmost part), the medium-to-low-temperature zone up to about 1300 degrees C., the high-temperature zone having the highest temperature of 1500 degrees C., and the cooling zone at the right part after the highest temperature zone are formed. It is noted that the present invention assumes an atmosphere furnace that is continuously operated under the positive in-furnace pressure and the in-furnace pressure is controlled so as to prevent air outside the furnace from entering the furnace. In this case, the in-furnace pressure is maintained at a positive pressure of 20 to 200 (pascals) so that outside air is prevented from entering the furnace to maintain in-furnace atmosphere.

A to-be-burned object in the present invention is a to-be-burned object containing a metal Si component and a ceramics composition formed body mainly containing SiC or $Si_3N_4$. In the case of the composition as described above, an SiO component generated by the oxidization thereof under the low-oxygen atmosphere gas environment vaporizes under in a high temperature state and is included in the in-furnace gas. It is noted that the low-oxygen atmosphere in the present invention means a state having an oxygen concentration of 2000 ppm or less.

Figure 4:
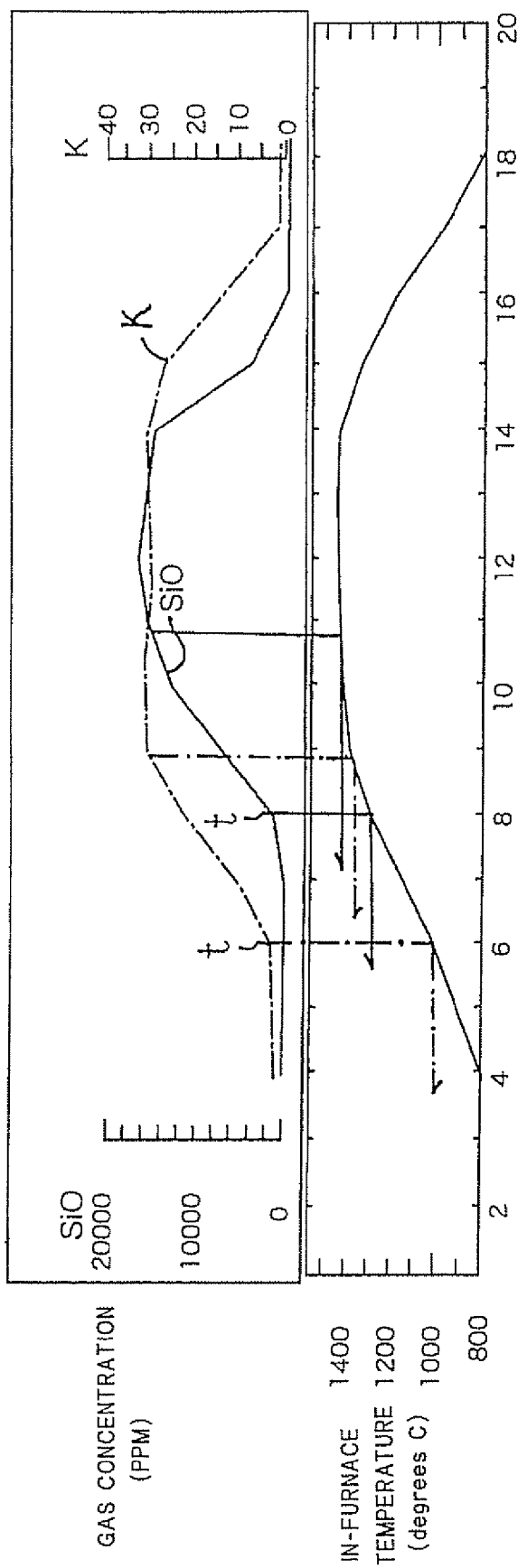
FIG. 4 is a graph showing an example of a temperature curve and a gas concentration of a vaporized component in the continuous furnace.
Figure 5:
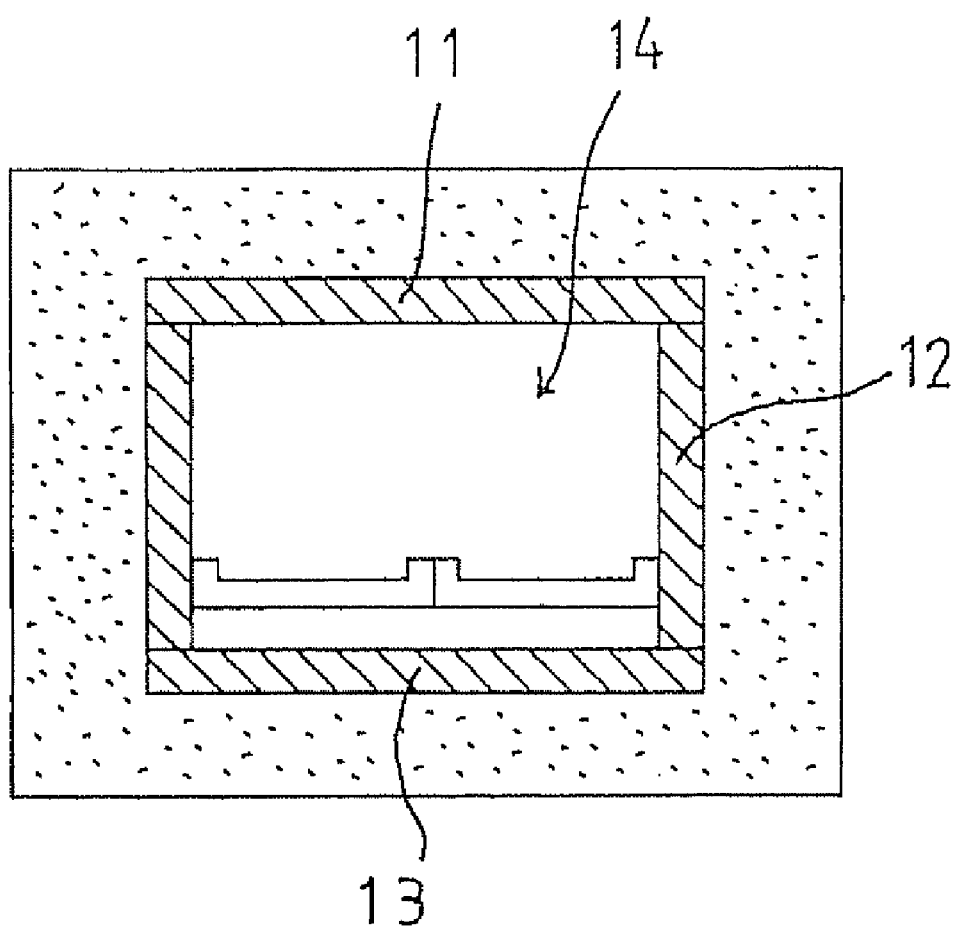
FIG. 5 is a schematic longitudinal cross-sectional view crossing the burning path of the continuous furnace.

With regards to a relation between the in-furnace concentration distribution of the vaporized/concentrated component as described above and the in-furnace temperature, the present inventors of this application have found the findings as illustrated in FIG. 4, for example. It is understood that SiO included in the in-furnace gas actively vaporizes at a temperature of 1300 degrees C. or more and shows the vaporization at the upper limit 1400 degrees C. Supplementary, as to alkaline, it is understood that the alkaline component K actively vaporizes at 1000 degrees C. and shows the vaporization at the upper limit at 1350 degrees C.

The exhaust structure of the present invention can be summarized to the following four points (see FIG. 1). 1) The exhaust duct 2 made of ceramic or heat-resistant steel through which the in-furnace gas is taken out is provided at an upper part of an in-furnace wall 12 of a higher temperature region than the concentration temperature of an alkaline component or SiO vaporized during the burning process. In the present invention, the term "the higher temperature region than the concentration temperature" means a temperature zone within which the vaporization is more active than the concentration. Specifically, it means to a temperature equal to or higher than a folding point t of the concentration curve of FIG. 4 that is 1300 degrees C. or more in the case of SiO and that is 1000 degrees C. or more in the case of the alkaline component K.

Since the vaporized component generally remains at the upper part of the in-furnace with a high concentration, it is important to provide the inlet of the exhaust duct 2 at the upper part of the in-furnace side wall 12 in the temperature zone. When the continuous furnace of the present invention is pressure-controlled so as to flow the in-furnace gas from the outlet to the inlet in the high temperature region, the exhaust duct 2 is preferably provided at the downstream of the in-furnace gas.

2) This exhaust duct 2 is attached in a downward direction with the attachment angle a of 5 to 20 degrees. This attachment angle is found through experiences. In the continuous furnace of the present invention operated with a positive in-furnace pressure, it is required to strictly prevent outside air from accidentally flowing back and entering the furnace. The use of the attachment angle as described above can allow the in-furnace gas to be stably flowed out while preventing outside air from entering the furnace and without using an exhaust pump for example.

3) The outlet side of the exhaust duct 2 to the outside of the furnace is connected to the exhaust pipe 3 that is provided in an up-and-down direction and that consists of heat-resistant metal. Through this exhaust pipe 3, SiO in the in-furnace gas flowed out as described later is oxidized. Since the oxidization reaction is slower with a lower temperature, a temperature of 650 degrees C. or more is particularly preferably maintained by an appropriate use of insulating material.

The interior of the pipe must be cleaned with a certain time cycle even when the insulating processing as described above is used. Thus, the exhaust pipe 3 is preferably formed as a straight pipe and preferably has cleaning cover members 32 and 33 at the upper and lower sides to realize an easy maintenance.

4) The gas flow path of the exhaust pipe 3 includes oxygen supply holes 31a and 31b for the oxidization of SiO and is connected to a supply piping (not shown) having an oxygen tank or (heated) air (not shown) as a supply source. The SiO taken out of the exhaust duct 2 is supplied with oxygen and is mixed with oxygen and the mixture oxidizes in the exhaust pipe 3 for a detoxifying purpose.

According to this embodiment, an exhaust pump is not required in a positive in-furnace pressure and vaporized alkaline component or SiO can be flowed out efficiently to reduce a risk where outside air flows into the furnace. Furthermore, the continuous furnace having the exhaust structure can be provided through which SiO that tends to generate heat can be stably oxidized to turn into $SiO_2$ for a detoxifying purpose and even a polluted or damaged exhaust pipe can be easily cleaned to realize easy maintenance. The detoxifying processing also can advantageously provide an easy cleaning of a bug filter for example in the subsequent exhaust gas processing.

It is noted that the upper part of the exhaust pipe 3 is connected with the second exhaust pipe 4 in FIG. 1 so that the second exhaust pipe 4 faces in an obliquely-upward direction and this second exhaust pipe 4 is attached with the third exhaust pipe 5 facing the upward direction so that the in-furnace gas is guided through the exhaust opening 51 at a tip end of this third exhaust pipe 5 to an exhaust gas processing apparatus. The structure as described above provides the time and space required for the above-described oxidization reaction of SiO. The second exhaust pipe 4 and the third exhaust pipe 5 are also formed as a straight pipe having an opening/closing cover so that the second exhaust pipe 4 and the third exhaust pipe 5 can be advantageously subjected to maintenance such as cleaning during an operation without stopping the exhaust.

First Invention

Next, the first invention that is the exhaust method of the continuous furnace of the present invention will be described with reference to the above-described exhaust structure. The present invention is an exhaust method of the continuous furnace for continuously burning a to-be-burned object containing an alkaline component or an Si component that vaporizes during a burning operation and that concentrates when having a decreasing temperature. The exhaust method can be summarized as having the following steps.

1) In-furnace gas including alkaline component or SiO vaporized during a burning process is exhausted out of the furnace.

This exhaust uses the exhaust duct 2 as shown in FIG. 1. This exhaust duct 2 is provided, as described above, at the upper part of the in-furnace wall 12 at a temperature region having a higher temperature (1300 degrees C. or more) than the concentration temperature of SiO vaporized during the burning process. In this manner, SiO remaining at the upper part in the furnace with a high concentration can be efficiently exhausted.

2) The exhausted SiO is oxidized outside of the furnace and is detoxified.

The in-furnace gas exhausted by the exhaust duct 2 is guided to the exhaust pipe 3 that is connected to the outlet of the exhaust duct 2 at the outside of the furnace and that is provided in a vertical manner. This exhaust pipe 3 is provided with an oxygen supply hole 31. By sending oxygen supplied from an appropriate oxygen supply source into the exhaust pipe 3, SiO introduced to the exhaust pipe 3 can react with oxygen and can be detoxified. In this case, in order to prevent a declined reactivity of SiO, a temperature is particularly preferably retained at 650 degrees C. or more, Thus, detoxified SiO can be discharged to the outside of the system.

Third and Fourth Inventions

Figure 2:
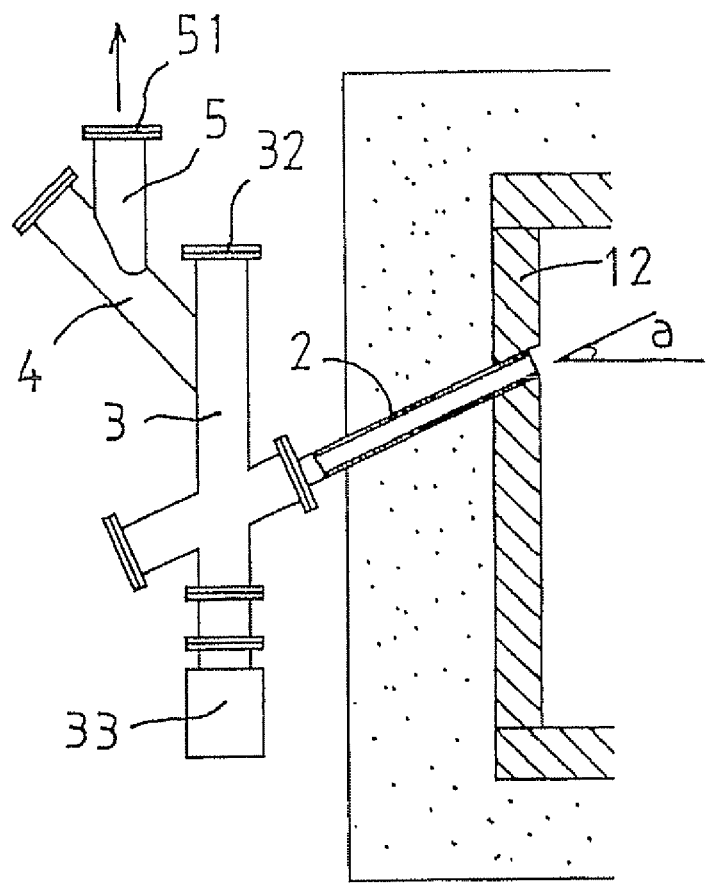
FIG. 2 is a main part side view/partial cutaway cross-sectional view of another apparatus of the exhaust structure.

The exhaust structure illustrated in FIG. 2 is directed to the third and fourth inventions of the present invention for extracting the alkaline component included in the in-furnace gas. The exhaust structure illustrated in FIG. 2 is basically the same as the exhaust structure for coping with SiO of FIG. 1 except for that the exhaust duct 2 is attached to a region having a temperature of 1000 degrees C. or more where alkaline actively vaporizes and that the exhaust pipe 3 is not provided with an oxygen supply means. In the present invention, exhaust structures for coping with alkaline and SiO are preferably provided separately.

In the third invention, 1) the positive pressure of the alkaline component vaporized during the burning process is used to exhaust, as described above, the alkaline component to the outside of the furnace through the exhaust duct provided at the upper part of the in-furnace wall 12 at a region having a higher temperature (1000 degrees C. or more) than the temperature at which the alkaline component vaporized during the burning process concentrates. In this manner, the alkaline component remaining at the upper part of the furnace with a high concentration can be exhausted without requiring an exhaust apparatus.

INDUSTRIAL APPLICABILITY

As described above, the exhaust method and the exhaust structure of the continuous furnace of the present invention are highly industrially applicable in that the conventional disadvantages are solved.

The invention claimed is:

1. An exhaust method of a continuous furnace for continuously burning a to-be-burned object containing a metal Si component or highly-fire-resistant SiC or $Si_3N_4$, the method comprising:
    exhausting, at a region having a higher temperature than a concentration temperature of SiO generated and vaporized by an oxidization of the metal Si component or highly-fire-resistant SiC or $Si_3N_4$, in-furnace gas including the SiO by a positive pressure of an in-furnace atmosphere; and
    oxidizing SiO outside of the furnace to detoxify SiO.

2. An exhaust structure of a continuous furnace for continuously burning a to-be-burned object containing a metal Si component or highly-fire-resistant SiC or $Si_3N_4$ under a positive in-furnace pressure, the exhaust structure comprising:
    an exhaust duct at an upper part of a side wall of the furnace at a region having a higher temperature than a concentration temperature of SiO generated and vaporized by an oxidization of the metal Si component or highly-fire-resistant SiC or $Si_3N_4$, the exhaust duct being oriented in a downward direction at an angle between 5 and 20 degrees with respect to a plane that is parallel to a bottom surface of the furnace; and
    an exhaust pipe connected to an outlet of the exhaust duct located outside of the furnace, the exhaust pipe being oriented in an up-and-down direction and including a straight pipe, wherein the exhaust pipe is provided with an oxygen supply device to oxidize the SiO taken out from the exhaust duct.

3. An exhaust method of a continuous furnace for continuously burning a to-be-burned object containing an alkaline component that vaporizes during a burning process and that concentrates when having a decreasing temperature, the method comprising:
  exhausting the alkaline component to the outside of the furnace by a positive pressure of an in-furnace atmosphere at a region having a higher temperature than a concentration temperature of the alkaline component vaporized during a burning process.

4. An exhaust structure of a continuous furnace for continuously burning a to-be-burned object containing an alkaline component that vaporizes during a burning process and that concentrates when having a decreasing temperature under a positive in-furnace pressure, the exhaust structure comprising:
  an exhaust duct at an upper part of a side wall of the furnace at a region having a higher temperature than a concentration temperature of the alkaline component vaporized during a burning process, the exhaust duct being oriented in a downward direction at an angle between 5 and 20 degrees with respect to a plane that is parallel to a bottom surface of the furnace; and
  an exhaust pipe connected to an outlet of the exhaust duct located outside of the furnace, the exhaust pipe being oriented in an up-and-down direction and including a straight pipe.

* * * * *